US011658367B2

(12) United States Patent
Ryu et al.

(10) Patent No.: US 11,658,367 B2
(45) Date of Patent: May 23, 2023

(54) BATTERY PACK

(71) Applicant: LG Chem, Ltd., Seoul (KR)

(72) Inventors: Jae Uk Ryu, Daejeon (KR); Dal Mo Kang, Daejeon (KR); Jeong Oh Moon, Daejeon (KR); Jae Min Yoo, Daejeon (KR); Min Ho Kwon, Daejeon (KR)

(73) Assignee: LG Energy Solution, Ltd.

( * ) Notice: Subject to any disclaimer, the term of this patent is extended or adjusted under 35 U.S.C. 154(b) by 99 days.

(21) Appl. No.: 16/650,673

(22) PCT Filed: Dec. 27, 2018

(86) PCT No.: PCT/KR2018/016735
§ 371 (c)(1),
(2) Date: Mar. 25, 2020

(87) PCT Pub. No.: WO2019/190028
PCT Pub. Date: Oct. 3, 2019

(65) Prior Publication Data
US 2021/0043907 A1    Feb. 11, 2021

(30) Foreign Application Priority Data
Mar. 26, 2018   (KR) .......... 10-2018-0034680

(51) Int. Cl.
*H01M 50/502*   (2021.01)
*H01M 50/50*    (2021.01)
(Continued)

(52) U.S. Cl.
CPC ....... *H01M 50/502* (2021.01); *H01M 50/204* (2021.01); *H01M 50/50* (2021.01); *H01M 50/583* (2021.01); *H01M 2220/20* (2013.01)

(58) Field of Classification Search
CPC .............. H01M 50/502; H01M 50/20; H01M 2220/20; H01M 50/505; H01M 50/581;
(Continued)

(56) References Cited

U.S. PATENT DOCUMENTS 2,720,567 A * 10/1955 Detch ................... H01H 85/10
337/295
3,417,357 A * 12/1968 Johns ................... H01H 85/10
337/228
(Continued)

FOREIGN PATENT DOCUMENTS

DE        1184408     * 12/1964
JP     2007250301 A    9/2007
(Continued)

OTHER PUBLICATIONS

International Search Report for Application No. PCT/KR2018/016735, dated Apr. 12, 2019, pp. 1-2.

*Primary Examiner* — Michael L Dignan
(74) *Attorney, Agent, or Firm* — Lerner David LLP

(57) ABSTRACT

A battery pack includes a battery cell and a bus bar electrically connected to the battery cell, wherein the bus bar includes a rupture portion configured to melt due to electric resistance heat generated by overcurrent and thus to rupture, the rupture portion having a plurality of through-holes therein.

3 Claims, 7 Drawing Sheets

(51) Int. Cl.
*H01M 50/204* (2021.01)
*H01M 50/583* (2021.01)

(58) Field of Classification Search
CPC ........... H01M 50/204; H01M 2200/10; H01M 2200/103; Y02E 60/10; H01H 85/048; H01H 85/08; H01H 85/10
See application file for complete search history.

(56) References Cited

U.S. PATENT DOCUMENTS

| | | | | |
|---|---|---|---|---|
| 4,511,874 A | * | 4/1985 | Rasmussen | H01H 85/10 337/159 |
| 4,654,620 A | * | 3/1987 | Rooney | H01H 85/10 337/159 |
| 2009/0111015 A1 | | 4/2009 | Wood | H01M 50/514 429/164 |
| 2009/0297892 A1 | * | 12/2009 | Ijaz | H01M 50/213 429/7 |
| 2010/0255351 A1 | * | 10/2010 | Ijaz | H01M 50/20 429/7 |
| 2011/0171505 A1 | * | 7/2011 | Kishll | H01M 50/20 429/82 |
| 2013/0004831 A1 | * | 1/2013 | Byun | H01M 10/0431 429/179 |
| 2013/0136960 A1 | * | 5/2013 | Guen | H01M 50/581 429/61 |
| 2013/0136974 A1 | | 5/2013 | Lim et al. | |
| 2013/0149919 A1 | | 6/2013 | Lee et al. | |
| 2015/0050531 A1 | * | 2/2015 | Felser | H01M 50/502 429/61 |
| 2016/0336572 A1 | * | 11/2016 | Yoshida | H02J 7/007192 |
| 2018/0040918 A1 | * | 2/2018 | Guen | H01M 50/581 |
| 2018/0047970 A1 | | 2/2018 | Lee | |

FOREIGN PATENT DOCUMENTS

| | | |
|---|---|---|
| KR | 101264579 B1 | 5/2013 |
| KR | 20130060420 A | 6/2013 |
| KR | 20160076156 A | 6/2016 |
| KR | 101649135 B1 | 8/2016 |
| KR | 101671486 B1 | 11/2016 |
| KR | 20170027498 A | 3/2017 |
| KR | 20170078365 A | 7/2017 |

* cited by examiner

BATTERY PACK

CROSS-REFERENCE TO RELATED APPLICATIONS

This application is a national phase entry under 35 U.S.C. § 371 of International Application No. PCT/KR2018/016735, filed Dec. 27, 2018, which claims the benefit of priority to Korean Patent Application No. 10-2018-0034680 filed on Mar. 26, 2018, the disclosures of which are hereby incorporated by reference herein their entirety.

TECHNICAL FIELD

The present invention relates to a battery pack, and more particularly to a battery pack including a bus bar configured to rupture in the event of overcurrent.

BACKGROUND ART

With an increase in the demand for portable electronic devices, such as laptop computers, smartphones, and tablet computers, research has been actively conducted on high-performance secondary batteries that are capable of being repeatedly charged and discharged.

In addition, secondary batteries have come to be widely used in middle- or large-sized devices, such as vehicles, robots, and satellites, as well as small-sized devices, such as portable electronic devices. In particular, as fossil fuels are being depleted and increasing attention is being paid to environmental pollution, research on hybrid vehicles and electric vehicles has been actively conducted. The most core part of a hybrid vehicle or an electric vehicle is a battery pack configured to supply electric power to a motor.

The hybrid vehicle or the electric vehicle has an advantage in that fuel economy is high and no pollutants are discharged or the amount of pollutants that are discharged is reduced compared to a vehicle using only an internal combustion engine, since it is possible to obtain drive force from the battery pack.

The battery pack used in the hybrid vehicle or the electric vehicle includes a battery module, which includes a plurality of battery cells. The battery cells are connected to each other in series and/or in parallel, whereby the capacity and output of the battery module are increased.

When using such a battery pack, it is very important to secure the safety thereof. Particularly, in the case of a hybrid vehicle or an electric vehicle configured for people to ride therein, the occurrence of safety-related accidents may directly cause injury to people.

One of the safety-related accidents that may occur in the battery pack is overheating of the battery pack. The battery pack may overheat for various causes. In the case in which overcurrent exceeding limit current flows through the battery pack, for example, the battery pack may overheat.

Overheating of the battery pack causes decomposition of an electrolytic solution. In the case in which the electrolytic solution is decomposed, thermal runaway may occur, whereby the battery pack may overheat, explode, or burst.

DISCLOSURE

Technical Problem

The present invention has been made in view of the above problems, and it is an object of the present invention to provide a battery pack that is capable of preventing an accident that may occur due to overcurrent.

Technical Solution

In accordance with an aspect of the present invention, the above and other objects can be accomplished by the provision of a battery pack including a battery cell and a bus bar electrically connected to the battery cell, wherein the bus bar includes a rupture portion configured to melt due to electric resistance heat generated by overcurrent and thus to rupture, the rupture portion having a plurality of through-holes therein.

The plurality of through-holes may be disposed along an imaginary connection line that forms a predetermined angle with respect to the direction in which current flows in the bus bar.

The plurality of through-holes may be arranged along a plurality of imaginary connection lines that are spaced apart from each other, each of the plurality of imaginary connection lines forming a predetermined angle with respect to a direction in which current flows in the bus bar.

At least one of the plurality of imaginary connection lines may form a predetermined angle with respect to another one of the plurality of imaginary connection lines.

The plurality of through-holes may be formed so as not to overlap each other in a direction perpendicular to a direction in which current flows in the bus bar.

The plurality of through-holes may be formed so as to be spaced apart from each other by a predetermined distance in a direction in which current flows in the bus bar.

At least some of the plurality of through-holes may have different sizes.

Regions configured such that the plurality of through-holes are not formed therethrough may be formed between the respective through-holes in a direction in which current flows in the bus bar.

In accordance with another aspect of the present invention, there is provided a battery module including two battery cells and a bus bar electrically connected to the two battery cells, wherein the bus bar includes a rupture portion configured to melt due to electric resistance heat generated by overcurrent and thus to rupture, the rupture portion having a plurality of through-holes therein.

Advantageous Effects

A battery pack according to an embodiment of the present invention has the effect of maintaining a basic characteristic in which a bus bar ruptures to thus interrupt the flow of current when overcurrent flows through the bus bar (a first characteristic) and securing a characteristic in which the mechanical strength of a rupture portion that may be lowered due to formation of a plurality of through-holes is supplemented (a second characteristic).

BEST MODE

Hereinafter, a battery pack according to an embodiment of the present invention will be described with reference to the accompanying drawings.

Figure 1:
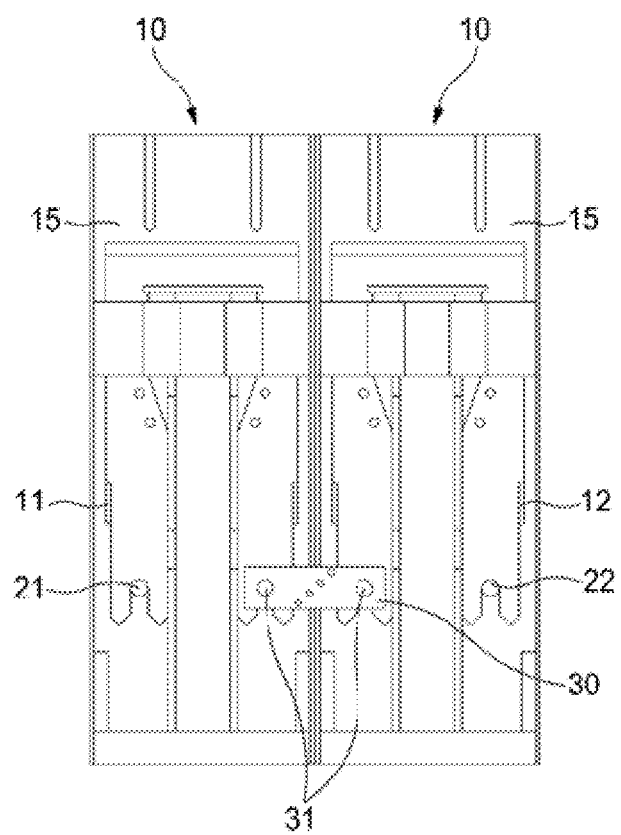
FIG. 1 is a view schematically showing a battery pack according to an embodiment of the present invention.
Figure 2:
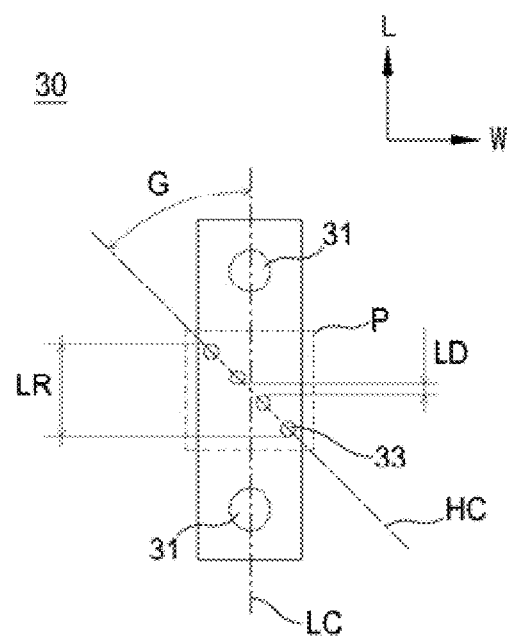
FIGS. 2 to 5 are views schematically showing examples of implementation of a bus bar that may be included in the battery pack according to the embodiment of the present invention.

As shown in FIG. 1, the battery pack according to the embodiment of the present invention may include a plurality of battery modules 10, which are connected to each other in series or in parallel depending on the purpose thereof. Each of the battery modules 10 may include a cell assembly, in which a plurality of battery cells (not shown) is installed in a cartridge in the state of being sequentially stacked. Each of the battery cells may include electrode leads 11 and 12. The electrode leads 11 and 12 may include a positive electrode lead 11 and a negative electrode lead 12. In general, each of the electrode leads 11 and 12 is formed in a flat shape, and is exposed outside a sheathing member 15 configured to surround each of the battery modules 10. Adjacent electrode leads 11 and 12 may be electrically connected to each other, whereby adjacent battery cells may be electrically connected to each other.

The electrode leads 11 and 12 may be connected to connection terminals 21 and 22, which are exposed outside, respectively, and the connection terminals 21 and 22 may be connected to each other via a bus bar 30. Coupling holes 31 configured to be coupled to the connection terminals 21 and 22 may be formed in the bus bar 30. A connection terminal 21 connected to a positive lead 11 of one battery module 10, which is one of a pair of battery modules 10, and a connection terminal 22 connected to a negative lead 12 of the other battery module 10 may be coupled to the coupling holes 31. Consequently, a plurality of battery modules 10 may be electrically connected to each other via the bus bar 30.

As shown in FIGS. 2 to 5, the bus bar 30 may be formed in a flat shape having a width (lateral direction) W and a length (longitudinal direction) L. The bus bar 30 may be made of an electrically conductive metal. The bus bar 30 may be made of a material that is fusible by resistance heat generated due to overcurrent. For example, the bus bar 30 may be made of copper. The coupling holes 31 may be formed in opposite ends of the bus bar 30 in the longitudinal direction L of the bus bar 30. Consequently, current may flow in the longitudinal direction L of the bus bar 30. In the embodiment of the present invention, a structure in which current flows in the longitudinal direction L of the bus bar 30 is described. However, current may flow in the lateral direction W of the bus bar 30, rather than in the longitudinal direction L of the bus bar 30, depending on the shape of the bus bar 30 and the position of the coupling holes 31.

The bus bar 30 may include a rupture portion P configured to melt due to electric resistance heat and thus to rupture when overcurrent flows through the bus bar 30. A plurality of through-holes 33 may be formed in the rupture portion P. As a plurality of through-holes 33 is formed in the rupture portion P, the portion of the bus bar 30 in which the through-holes 33 are formed has a smaller sectional area than the remaining portion of the bus bar 30 in the lateral direction W of the bus bar 30.

When overcurrent flows through the bus bar 30, therefore, the electric resistance of the rupture portion P, which has a relatively small sectional area, greatly increases in local regions thereof, whereby the rupture portion P is locally heated, melts, and ruptures. As a result, the bus bar 30 is cut, whereby the flow of overcurrent may be interrupted.

As the bus bar 30 includes a rupture portion P having a plurality of through-holes 33 formed therein, the mechanical strength (for example, the tensile strength) of the rupture portion P may be reduced. Even in the case in which overcurrent does not flow through the bus bar 30, therefore, stress may be concentrated on the rupture portion P due to an external impact, whereby the rupture portion P may rupture.

Figure 6:
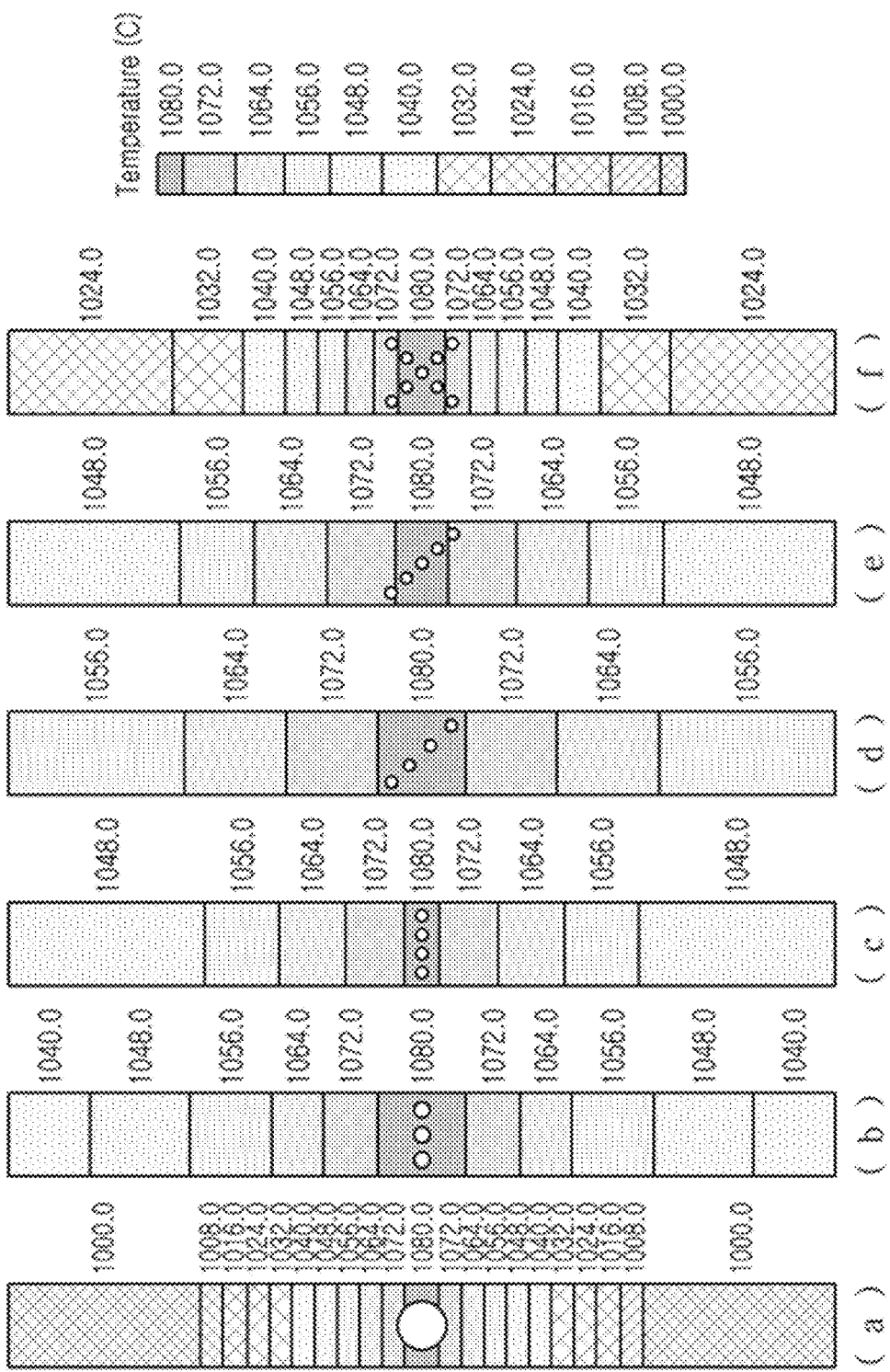
FIG. 6 is a view showing the thermal properties (temperature distributions) of rupture portions of various kinds of bus bars that may be included in the battery pack according to the embodiment of the present invention.

Particularly, in the case of an A-type bus bar having a single large-sized through-hole formed therein and in the case of a B-type bus bar and a C-type bus bar having a plurality of through-holes formed therein so as to be arranged in a line only in the lateral direction W of the bus bar (the direction perpendicular to the current flow direction L), as shown in FIG. 6, a plurality of through-holes is intensively formed in a small-sized rupture portion. When an external impact is applied, therefore, stress may be concentrated on the rupture portion, which has a small area. Consequently, the rupture portion P may rupture in the event of an external impact even in the case in which overcurrent does not flow through the bus bar 30.

In order to increase the mechanical strength of the bus bar 30 at the rupture portion P, it is preferable to increase the area of the rupture portion P (the size of the region in which a plurality of through-holes 33 is distributed) in the longitudinal direction L of the bus bar 30, compared to the A-type bus bar, the B-type bus bar, and the C-type bus bar.

To this end, as shown in FIGS. 2 to 5, the through-holes 33 may be arranged in a line having a predetermined angle G with respect to the current flow direction L. That is, the through-holes 33 may be arranged in an oblique direction (a diagonal direction) with respect to the current flow direction L. That is, a central axis LC of the bus bar 30, which is parallel to the current flow direction L, and an imaginary connection line HC that interconnects the through-holes 33 may form a predetermined angle G therebetween. As a result, the distance LR between the outermost through-holes 33 in the longitudinal direction L of the bus bar may be increased. Consequently, the area of the rupture portion P (the size of the region in which the through-holes 33 are distributed) may be increased in the longitudinal direction L of the bus bar 30.

In the case in which the bus bar 30 includes a plurality of through-holes 33 arranged as described above, it is possible to realize not only a basic characteristic in which the bus bar 30 ruptures to interrupt the flow of current when overcurrent flows through the bus bar 30 (hereinafter, referred to as a first characteristic) but also a characteristic in which the mechanical strength of the rupture portion P, which may be lowered due to the formation of the through-holes 33 therein, is supplemented (hereinafter, referred to as a second characteristic).

Figure 7:
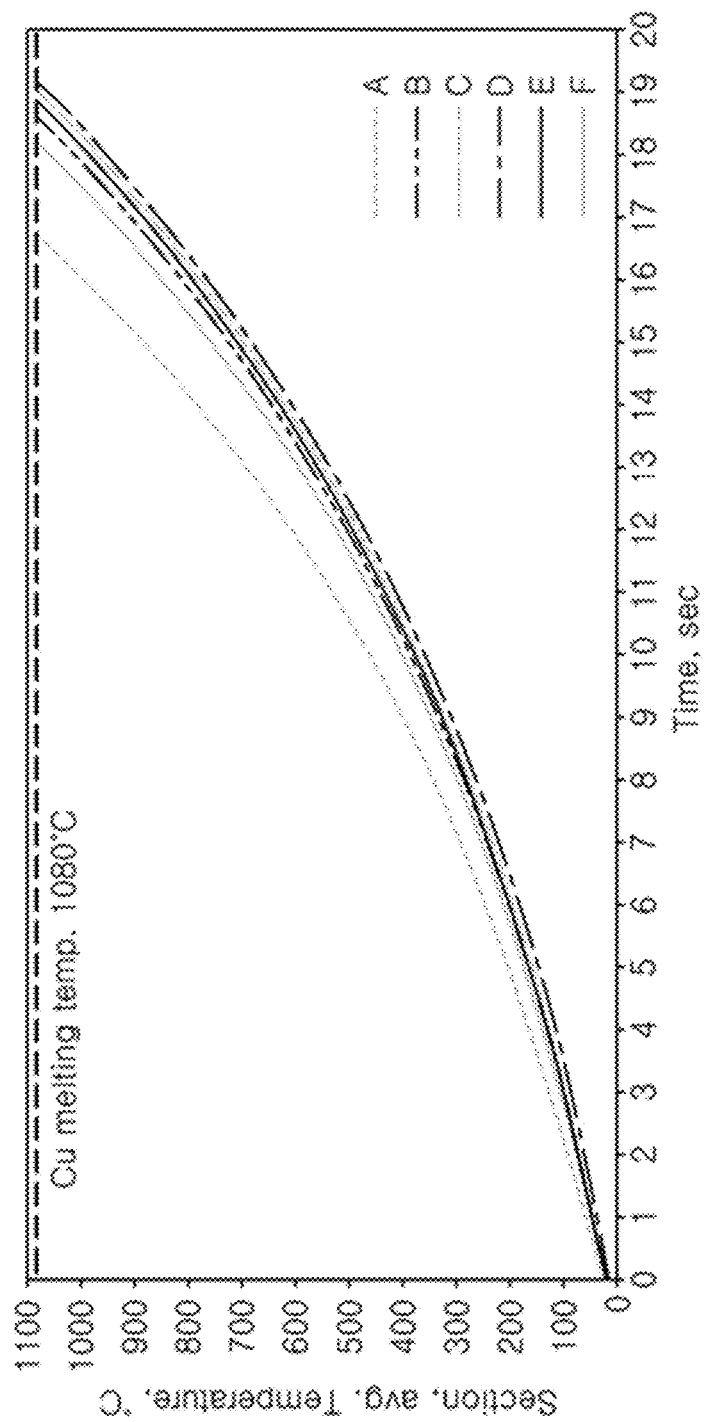
FIG. 7 is a graph showing a change over time in the temperature of the rupture portions of the bus bars that may be included in the battery pack according to the embodiment of the present invention.

In order to realize both the first characteristic and the second characteristic, it is possible to derive the optimum arrangement of the through-holes 33 through a plurality of experiments and a plurality of simulations, as shown in FIGS. 6 and 7.

Here, the first characteristic may be realized by reducing the sectional area in the direction W, which is perpendicular to the current flow direction L. The second characteristic may be realized by distributing the through-holes 33 in the longitudinal direction L of the bus bar 30.

In order to distribute the through-holes 33 in the longitudinal direction L of the bus bar 30 while reducing the sectional area in the direction W, which is perpendicular to the current flow direction L, it is preferable for the angle G between the connection line HC that interconnects the through-holes 33 and the central axis LC of the bus bar 30, which is parallel to the current flow direction L, to be about 45 degrees and at least 30 to 60 degrees.

In order to further supplement the mechanical strength of the rupture portion P of the bus bar 30, it is preferable to form the through-holes 33 so as not to overlap each other in the lateral direction W of the bus bar 30. That is, at least two of the through-holes 33 may be disposed so as to have a distance LD therebetween in the longitudinal direction L of the bus bar 30. That is, the through-holes 33 may be disposed so as to be spaced apart from each other in the longitudinal direction L of the bus bar 30. As a result, predetermined regions through which the through-holes 33 are not formed may be formed between the respective through-holes 33 in the longitudinal direction L of the bus bar 30. Consequently, the mechanical strength of the rupture portion P of the bus bar 30 may be maintained due to the presence of the predetermined regions.

Figure 3:
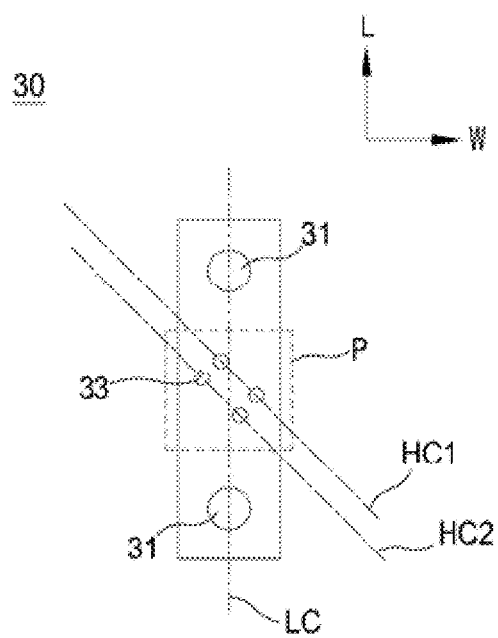
Figure 4:
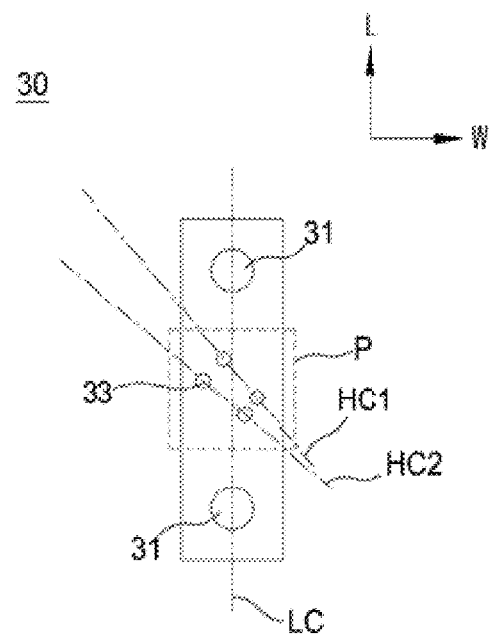

In order to maintain the mechanical strength of the rupture portion P of the bus bar 30, as shown in FIGS. 3 and 4, the through-holes 33 may be distributed in the optimum arrangement. The through-holes 33 may be disposed along at least two imaginary connection lines HC1 and HC2. The connection lines HC1 and HC2 may be parallel to each other, or may intersect each other. In the case in which the connection lines HC1 and HC2 are parallel to each other or intersect each other, the through-holes 33 may be arranged in a zigzag fashion (alternately) in the longitudinal direction L and the lateral direction W of the bus bar 30. In the case in which the connection lines HC1 and HC2 intersect each other (i.e. in the case in which the connection lines HC1 and HC2 form a predetermined angle), the through-holes 33 may be arranged in a V shape.

Figure 5:
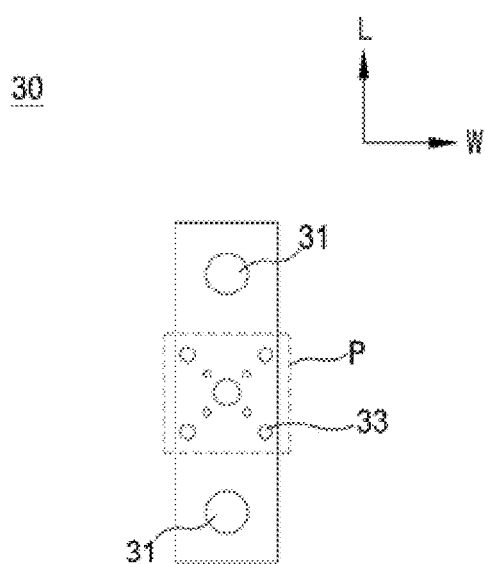

As shown in FIG. 5, at least some of the through-holes 33 may have different sizes (diameters). The size of the regions between the respective through-holes 33 may be changed depending on the size of each of the through-holes 33. The sectional area in the direction W, which is perpendicular to the current flow direction L, and the distance LD between the through-holes 33 in the longitudinal direction L of the bus bar 30 may be changed depending on the size of each of the through-holes 33. Consequently, it is possible to optimally realize the first characteristic and the second characteristic by changing the size of each of the through-holes 33.

In the case in which an external short circuit occurs due to various causes and thus overcurrent flows through the bus bar 30, electric resistance heat is generated in the rupture portion P having therein the through-holes 33. In particular, electric resistance is concentrated on the regions between the through-holes 33, whereby the regions between the through-holes 33 are locally heated. When the temperature of the rupture portion P reaches the melting point of the material constituting the bus bar 30, the rupture portion P melts and thus ruptures. Consequently, it is possible to interrupt the flow of overcurrent through the bus bar 30, whereby it is possible to prevent an accident of the battery pack, such as thermal runaway, explosion, or bursting, which may occur due to overcurrent.

FIG. 6 is a view showing the thermal properties of a D-type bus bar, an E-type bus bar, and an F-type bus bar (temperature distribution in the rupture portion P of the bus bar 30), compared to the A-type bus bar, the B-type bus bar, and the C-type bus bar.

As previously described, the A-type bus bar has a single large-sized through-hole formed therein, and each of the B-type bus bar and the C-type bus bar has a plurality of through-holes arranged only in the lateral direction W of the bus bar (the direction perpendicular to the current flow direction L).

Each of the D-type bus bar, the E-type bus bar, and the F-type bus bar, which are bus bars according to embodiments of the present invention, has a plurality of through-holes 33 disposed along an imaginary connection line HC that forms an angle G with respect to the direction L in which current flows in the bus bar 30.

As can be seen from the temperature distribution in the rupture portion P of the bus bar 30 shown in FIG. 6, in the case of the A-type bus bar, the B-type bus bar, and the C-type bus bar, the sectional area of the rupture portion in the direction W, which is perpendicular to the current flow direction L, is reduced, whereby electric resistance is concentrated on the rupture portion and thus the rupture portion is locally heated. Also, in the case of the D-type bus bar, the E-type bus bar, and the F-type bus bar according to the embodiments of the present invention, it can be seen that heat is locally concentrated on the rupture portion P, in the same manner as in the A-type bus bar, the B-type bus bar, and the C-type bus bar. Consequently, it can be seen that the D-type bus bar, the E-type bus bar, and the F-type bus bar according to the embodiments of the present invention are capable of satisfactorily realizing the first characteristic.

FIG. 7 and Table 1 show the time taken for the temperature of the rupture portion of each of the bus bars to reach a melting point.

TABLE 1

| | A-type | B-type | C-type | D-type | E-type | F-type |
|---|---|---|---|---|---|---|
| Melting point arrival time(sec) | 16.7 | 18.6 | 18.8 | 19.1 | 18.9 | 18.2 |

As can be seen from FIG. 7 and Table 1, the D-type bus bar, the E-type bus bar, and the F-type bus bar according to the embodiments of the present invention differ little from the A-type bus bar, the B-type bus bar, and the C-type bus bar in terms of the melting point arrival time.

Consequently, it can be seen that the D-type bus bar, the E-type bus bar, and the F-type bus bar, each of which has a plurality of through-holes 33 disposed along an imaginary connection line HC that forms an angle G with respect to the direction L in which current flows in the bus bar 30, differ little from the A-type bus bar, the B-type bus bar, and the C-type bus bar in terms of the first characteristic.

In the case of the D-type bus bar, the E-type bus bar, and the F-type bus bar according to the embodiments of the present invention, however, the second characteristic can be improved compared to the A-type bus bar, the B-type bus bar, and the C-type bus bar, since the through-holes 33 are distributed in the longitudinal direction L of the bus bar 30.

The battery pack having the bus bar 30 according to the embodiment of the present invention described above has the effect of maintaining the basic characteristic in which the bus bar 30 ruptures to interrupt the flow of current when overcurrent flows through the bus bar 30 (the first characteristic) and securing the characteristic in which the mechanical strength of the rupture portion P, which may be lowered due to the formation of the through-holes 33 therein, is supplemented (the second characteristic).

Although the preferred embodiments of the present invention have been described illustratively, the scope of the present invention is not limited to the specific embodiments described herein, and the present invention can be appropriately modified within the category described in the claims.

The invention claimed is:

1. A battery pack comprising:
    a battery cell; and
    a bus bar electrically connected to the battery cell, wherein
    the bus bar comprises a rupture portion configured to melt due to electric resistance heat generated by overcurrent and thus to rupture, the rupture portion having a plurality of through-holes therein,
    wherein the plurality of through-holes are arranged along a plurality of imaginary connection lines including a first imaginary connection line and a second imaginary connection line that are spaced apart from each other, each of the first and second imaginary connection lines forming a predetermined angle with respect to a longitudinal direction of the bus bar,
    wherein in each of the first and second imaginary connection lines, the plurality of through-holes thereof is formed so as not to overlap each other in a direction perpendicular to a longitudinal direction of the bus bar, such that adjacent ones of the plurality of through-holes are spaced in the longitudinal direction of the bus bar by a region of the rupture portion, and such that no imaginary line extending in a direction perpendicular to the longitudinal direction of the bus bar passes through more than one of the plurality of through-holes of the respective one of the first and second imaginary connection lines,
    wherein an imaginary line extending in a direction perpendicular to the longitudinal direction of the bus bar passes through both of the first and second imaginary connection lines at a location inside of the bus bar,
    wherein the first imaginary connection line forms a predetermined angle with respect to the second imaginary connection line and crosses the second imaginary connection line at a location outside of the bus bar,
    wherein at least some of the plurality of through-holes have different diameters, and
    wherein the predetermined angle formed between each of the first and second imaginary connection lines and the longitudinal direction is 30 to 60 degrees.

2. The battery pack according to claim 1, wherein the predetermined angle formed between each of the first and second imaginary connection lines and the longitudinal direction is 45 degrees.

3. A battery module comprising:
    two battery cells; and
    a bus bar electrically connected to the two battery cells, wherein
    the bus bar comprises a rupture portion configured to melt due to electric resistance heat generated by overcurrent and thus to rupture, the rupture portion having a plurality of through-holes therein,
    wherein the plurality of through-holes are arranged along a plurality of imaginary connection lines including a first imaginary connection line and a second imaginary connection line that are spaced apart from each other, each of the first and second imaginary connection lines forming a predetermined angle with respect to the longitudinal direction,
    wherein in each of the first and second imaginary connection lines, the plurality of through-holes thereof is formed so as not to overlap each other in a direction perpendicular to a longitudinal direction of the bus bar, such that adjacent ones of the plurality of through-holes are spaced in the longitudinal direction of the bus bar by a region of the rupture portion, and such that no imaginary line extending in a direction perpendicular to the longitudinal direction of the bus bar passes through more than one of the plurality of through-holes of the respective one of the first and second imaginary connection lines,
    wherein an imaginary line extending in a direction perpendicular to the longitudinal direction of the bus bar passes through both of the first and second imaginary connection lines at a location inside of the bus bar,
    wherein the first imaginary connection lines forms a predetermined angle with respect to the second imaginary connection lines and crosses the second imaginary connection line at a location outside of the bus bar,
    wherein at least some of the plurality of through-holes have different diameters, and
    wherein the predetermined angle formed between each of the first and second imaginary connection lines and the longitudinal direction is 30 to 60 degrees.

* * * * *